United States Patent
Takahashi et al.

(10) Patent No.: US 8,006,363 B2
(45) Date of Patent: Aug. 30, 2011

(54) MANUFACTURING METHOD OF LENS WITH BUILT-IN HOLOGRAM ELEMENT

(75) Inventors: Nobuaki Takahashi, Tama (JP); Osamu Shibazaki, Tama (JP)

(73) Assignee: Konica Minolta Holdings Inc., Tokyo (JP)

( * ) Notice: Subject to any disclaimer, the term of this patent is extended or adjusted under 35 U.S.C. 154(b) by 1085 days.

(21) Appl. No.: 11/793,379

(22) PCT Filed: Dec. 13, 2005

(86) PCT No.: PCT/JP2005/022810
§ 371 (c)(1),
(2), (4) Date: Jun. 18, 2007

(87) PCT Pub. No.: WO2006/067997
PCT Pub. Date: Jun. 29, 2006

(65) Prior Publication Data
US 2007/0284768 A1    Dec. 13, 2007

(30) Foreign Application Priority Data
Dec. 22, 2004    (JP) .................................. 2004-371141

(51) Int. Cl.
*B23P 17/00* (2006.01)

(52) U.S. Cl. ................ 29/423; 29/424; 83/880; 83/879; 156/268

(58) Field of Classification Search .................... 29/423, 29/424; 83/879, 880, 23, 27; 156/254, 268
See application file for complete search history.

(56) References Cited

U.S. PATENT DOCUMENTS

| | | | |
|---|---|---|---|
| 4,445,956 A | * | 5/1984 | Freeman et al. ............. 156/154 |
| 5,622,540 A | * | 4/1997 | Stevens ........................... 65/112 |
| 5,886,822 A | * | 3/1999 | Spitzer .......................... 359/630 |

(Continued)

FOREIGN PATENT DOCUMENTS

| JP | 10-109811 A | 4/1998 |
|---|---|---|
| JP | 2002-156600 A | 5/2002 |

OTHER PUBLICATIONS

WO 2006/067997 A1 (with an English-language translation of the abstract), concerning International Application No. PCT/JP2005/022810, cites the following documents in the order they appear in the International Search Report (ISR) (with an English-language translation thereof).

*Primary Examiner* — Essama Omgba
(74) *Attorney, Agent, or Firm* — Sidley Austin LLP

(57) ABSTRACT

A method for manufacturing a hologram optical substrate having a hologram element includes: a cutting process that employs a laminate sheet having a pair of protective sheets with a hologram photosensitive sheet peelably interposed therebetween, and makes a cut to a depth for cutting the hologram photosensitive sheet, the cut corresponding to a hologram element forming section; a first peeling process that peels the protective sheet having the cut; a sticking process that sticks a hologram photosensitive material of the hologram element forming section to an inclined surface of the optical substrate, with the hologram photosensitive material adhered to the other protective sheet; a second peeling process that peels the other protective sheet; an exposure process that exposes the hologram photosensitive material to a laser beam after the second peeling process; and a developing process that develops the exposed hologram photosensitive material so as to form a hologram element.

16 Claims, 12 Drawing Sheets

U.S. PATENT DOCUMENTS

| | | | |
|---|---|---|---|
| 6,465,329 B1 * | 10/2002 | Glenn | 438/462 |
| 6,474,809 B2 * | 11/2002 | Tanijiri et al. | 351/41 |
| 6,816,132 B2 * | 11/2004 | Tanijiri et al. | 345/7 |
| 7,233,422 B2 * | 6/2007 | Endo et al. | 359/15 |
| 7,385,742 B2 * | 6/2008 | Endo et al. | 359/15 |
| 7,481,901 B2 * | 1/2009 | Toyoda et al. | 156/248 |
| 7,851,241 B2 * | 12/2010 | Maekawa et al. | 438/33 |
| 2002/0036751 A1 | 3/2002 | Tanijiri et al. | 351/244 |
| 2005/0245051 A1 * | 11/2005 | Maekawa et al. | 438/462 |
| 2006/0268421 A1 * | 11/2006 | Shimizu et al. | 359/630 |

* cited by examiner

FIG. 6
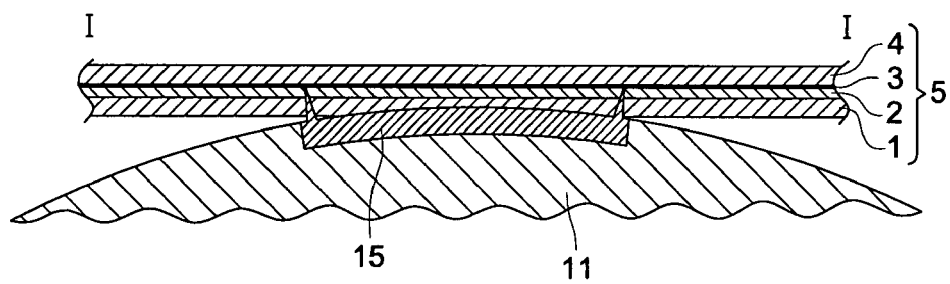
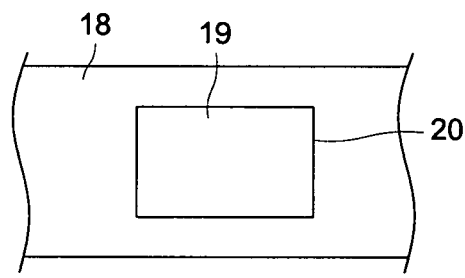
FIG. 7 ( a )
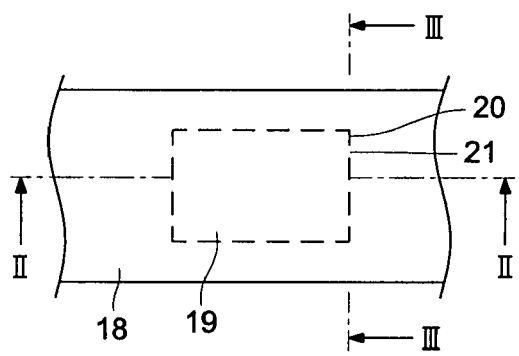
FIG. 7 ( b )
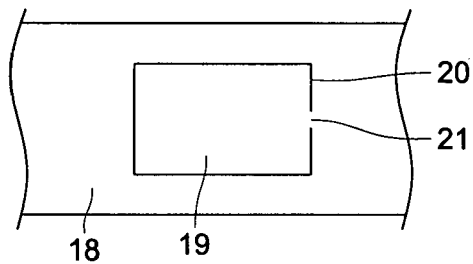
FIG. 7 ( c )

MANUFACTURING METHOD OF LENS WITH BUILT-IN HOLOGRAM ELEMENT

RELATED APPLICATIONS

This application is a National Stage of International Application No. PCT/JP2005/022810, filed Dec. 13, 2005, which is based on Japanese Patent Application No. 2004-371141 filed with Japanese Patent Office on Dec. 22, 2004, the entire content of which is incorporated herein by reference.

TECHNICAL FIELD

Regarding an image display device mounted on a part of a body such as a head region, the present invention relates to a manufacturing method for a hologram-element built-in lens that employs a hologram optical substrate.

BACKGROUND

In recent years, there have been developed an eyeglass type wearable display (hereinafter referred to as WD) and a head-count type display (hereinafter referred to as HMD) for the purposes of improvement of workability by a hand free way, information retrieval, vision correction for weak-sighted persons and practical experiences of various types of amusements.

A lens of WD or of HMD is provided with an optical substrate that guides an image coming from a display unit to the eyes optically. This optical substrate is provided with a hologram element which represents a reflection layer that reflects an image displayed by a controller of WD or of HMD on LCD or on an organic EL display.

For mounting the hologram element on the optical substrate, there is generally employed a method wherein a hologram element which has been subjected to laser exposure at a predetermined position on a thin-film-shaped unexposed hologram photosensitive sheet (hereinafter referred to as a hologram photosensitive sheet) is cut to be in predetermined form and size corresponding to the shape of an inclined surface representing a reflection surface of the optical substrate, to be stuck on a predetermined position on the optical substrate as a thin-film-shaped hologram element.

In each of WD and HMD on which a hologram element is provided in the aforesaid way, the weight is lighter, the power consumption is less and the life span is longer, compared with one employing no hologram element. It is further possible to realize a see-through type wherein a prism is used not to block the field of vision, and a real image of the actual scene and a virtual image of the hologram image can be seen simultaneously.

There has been suggested the following method as a method to stick a hologram element on a large-sized glass plate or the like effectively. Namely, an island-shaped hologram element and a positioning hologram element for positioning the island-shaped hologram element in the post-process are formed on the photosensitive sheet first by giving exposure to the hologram photosensitive sheet by the use of a mask on which a hole of the island-shaped hologram element forming portion and a positioning hole are provided. Next, this photosensitive sheet is interposed between a pair of protective sheets through adhesive layers to form laminated sheets. Further, slits are made on the aforesaid island-shaped hologram element portion and on a contour or a circumference of the positioning hologram element, from the protective layer on one side of the laminated sheet. By taking up the protective sheet on one side among the laminated sheets and a photosensitive sheet by a roller provided on a conveyance path through which the laminate sheet on which the slits are made is conveyed, an area other than the area on which the slits are made among the protective layer on one side and the photosensitive sheet, namely, an area portion other than a portion for the island-shaped hologram element and positioning hologram element, is separated from the protective sheet on the other side, and it is separated from the conveyance path. After that, a portion that is stuck on the island-shaped hologram element and on the positioning hologram element to stay without being separated among protective sheets on one side, namely, a portion on which slits are made on protective sheets on one side is stuck on one side of two-sided gluing agents to be removed. At this stage, there turns out to be the state wherein an island-shaped hologram element portion and a positioning element portion are stuck on the protective sheet on the other side to stay. Further, by detecting the positioning hologram element portion with a detecting mechanism, the island-shaped hologram element portion is positioned to be stuck, and at its position, the protective sheet on the other side and the adhered island-shaped hologram element portion are stabilized, then, the island-shaped hologram element portion is pressed by the roller against an object for adhesion from the upper part of the protective sheet on the other side to be stuck, and the protective sheet on the other side is taken up by the roller after the adhesion force is further enhanced, to be peeled off the island-shaped hologram element portion. Thus, the island-shaped hologram element portion only is stuck on an object for adhesion in the aforesaid way (Patent Document 1).

However, on WD and HMD, an inclined surface of an optical substrate on which a hologram element is stuck is small, and accuracy for laser exposure that is higher than that in the ordinary hologram element forming is required. Therefore, it is difficult to form accurately interference fringes through laser exposure at the predetermined position on a hologram photosensitive sheet that serves as an optical element of WD and HMD, which is a problem. Further, even if the hologram element of higher accuracy is formed, there still is a problem that it is difficult to specify the predetermined position for the laser exposure and to cut the hologram element to be in a predetermined form to stick the hologram element in the predetermined form on a small inclined surface of optical substrate accurately. There is further a problem that distortion and discoloration are observed on images when images are guided to eyes by wearing a completed WD or HMD, if the hologram element on which interference fringes are formed accurately is not stuck on the predetermined inclined surface of optical substrate. This causes a problem that the production efficiency of highly accurate optical substrate (hereinafter referred to as hologram optical substrate) on which a hologram element is stuck is lowered and production cost is increased.

Patent Document 1: Japanese Patent Publication Open to Public Inspection No. 10-109811

DISCLOSURE OF THE INVENTION

An objective of the invention is to provide a method for manufacturing a hologram optical substrate having a hologram element formed with high accuracy and usable for WDs and HMDs, with improved productivity.

To attain an object, as described above, in an aspect of the present invention, there is provided a hologram optical substrate manufacturing method for manufacturing a hologram optical substrate having a hologram element by a use of an optical substrate formed with an inclined surface and hologram photosensitive sheet, including:

a cutting process that employs a laminate sheet having a pair of protective sheets with a hologram photosensitive sheet peelably interposed between the pair of protective sheets, and makes a cut through either one of the protective sheets, from an outer surface of the one of the protective sheets at least to a depth for cutting the hologram photosensitive sheet along a thickness direction of the laminate sheet, the cut corresponding to a hologram element forming section;

a first peeling process that peels the protective sheet having the cut, from the hologram photosensitive sheet;

a sticking process that sticks a hologram photosensitive material of the hologram element forming section to an inclined surface of the optical substrate formed with the inclined surface, with the hologram photosensitive material adhered to the other protective sheet;

a second peeling process that peels the other protective sheet;

an exposure process that exposes the hologram photosensitive material of the hologram element forming section that is stuck on the inclined surface of the optical substrate, to a laser beam after the second peeling process; and a developing process that develops the exposed hologram photosensitive material of the hologram element forming section so as to form a hologram element.

BRIEF DESCRIPTION OF THE DRAWINGS

FIG. 2 (*b*) is a diagram illustrating an optical substrate L100*e* and an optical substrate L2*e*. The optical substrate L100*e* and the optical substrate L2*e* are unified to form a hologram-element built-in lens 200*e*.

FIG. 6 is a cross-sectional view taken on line I-I of the cutting mechanism 9 used in the invention.

FIG. 7 is a diagram showing half-cut portion 20 formed by inserting cutting edge 15 through an outer side surface of laminate sheet 5 and showing non-cut portion in the invention.

DESCRIPTION OF THE REFERENCE SYMBOLS

L1, L2: Optical substrate
100: Hologram element
L100: Hologram optical substrate
200: Hologram-element built-in lens

BEST MODE FOR PRACTICING OF THE INVENTION

A manufacturing method for the hologram-element built-in lens of the invention will be explained as follows, referring to FIG. 1-FIG. 22.

The manufacturing method for hologram-element built-in lens 200 representing a hologram optical lens includes an optical substrate forming process for at least forming an inclined surface at an edge of optical substrate L1 representing the first optical substrate, a hologram optical substrate forming process for forming hologram optical substrate L100 representing an eyepiece optical unit by making hologram element 100 through exposure of a hologram photosensitive material that is stuck on the inclined surface and an integration process for integrating the hologram optical substrate L100 and second optical substrate L2. As stated above, the hologram photosensitive material is stuck on the inclined surface, and then, is given exposure to form a hologram element, and further, two optical substrates are integrated, whereby, it is possible to simplify production processes while forming a highly accurate hologram element capable of being used for WD and HMD, and to improve productivity of a hologram-element built-in lens, which is an effect.

However, the scope of the invention is not limited to the illustrated examples.

(1) Optical Substrate Forming Process

Figure 1:
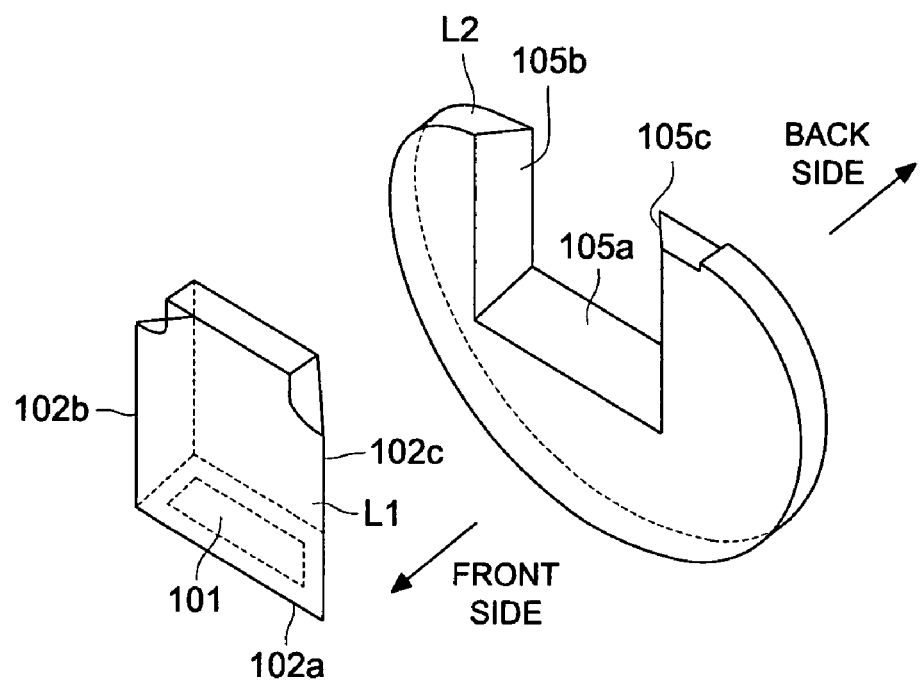
FIG. 1 is a diagram of optical substrate L1 and optical substrate L2 which represent an illustration of the first optical substrate and the second optical substrate which constitute a hologram-element built-in lens through the integration in the invention.

FIG. 1 shows an example of forms of optical substrate L1 and optical substrate L2 both constituting hologram-element built-in lens 200. Here, let it be assumed that the direction in which the pupil of an eye exists when an optical lens is mounted on a spectacles frame to be worn by a person is called the back side, and the direction in which a visible image is present is referred to as the front side.

The optical substrate forming process includes an injection molding process, an injection pressure molding process, a cutting process and a grinding process. In the optical substrate forming process such as an injection molding process, the first optical substrate and the second optical substrate are formed to be in predetermined forms respectively. In this case, an inclined surface on which a hologram photosensitive material which is to be given exposure later to be developed to become a hologram element is formed on an edge face of the first optical substrate. Further, a form of the second optical substrate is formed, corresponding to an outer form of the first optical substrate.

At an edge of an outer form of the first optical base L1 representing the first optical substrate, there is formed inclined surface 101 on which hologram element forming section 19 (see FIG. 5) of hologram photosensitive material is to be stuck. As explained below, hologram element forming section 19 of hologram photosensitive material stuck on the inclined surface 101 is subjected to an exposure process such as laser exposure and to a developing process, to become hologram element 100. Owing to this, the optical substrate L1 is formed to be hologram optical substrate L100. In this case, the inclined surface 101 is formed so that it may have an inclination angle capable of guiding a hologram image to the pupil of a person, when hologram-element built-in lens 200 is mounted as WD or HMD.

It is preferable that the optical substrate L1 is formed before the sticking process of the hologram optical substrate forming process.

Further, when forming optical substrate L2 representing second optical substrate having a cutout portion as shown in FIG. 1, it is preferable that a cutout portion forming process to form a cutout portion corresponding to the outer form of the optical substrate L1 is included. The reason for the foregoing is as follows; when integrating the first optical substrate and the second optical substrate through pick-and-place, the outer form of the optical substrate L1 can engage easily with the cutout portion of the optical substrate L2, and it is possible to form a substantially circular hologram-element built-in lens and to form hologram-element built-in lens 200 in a shape corresponding to user needs. Further, it is preferable that the optical substrate L2 is formed before the adhesion process of the integration process.

Optical substrate L1 representing the first optical substrate and optical substrate L2 representing the second optical substrate will be explained.

On the surfaces in the bottom direction and both side directions of the outer form of the optical substrate L1, there are formed joining surfaces 102 which join when the optical substrate L1 engages with the cutout portion of the optical substrate L2. The joining surfaces 102 of the outer form include joining surface 102a in the bottom direction, joining surface 102b in the right side surface direction on the front side and joining surface 102c in the left side surface direction on the front side.

On the central portion of the optical substrate L2, there is formed a cutout portion corresponding to joining surfaces 102 of an outer form of the optical substrate L1. This cutout portion is formed with corresponding joining surfaces 105a, 105b and 105c, so that joining surfaces 102a, 102b and 102c may join respectively with joining surfaces 105a, 105b and 105c.

Figure 2A:
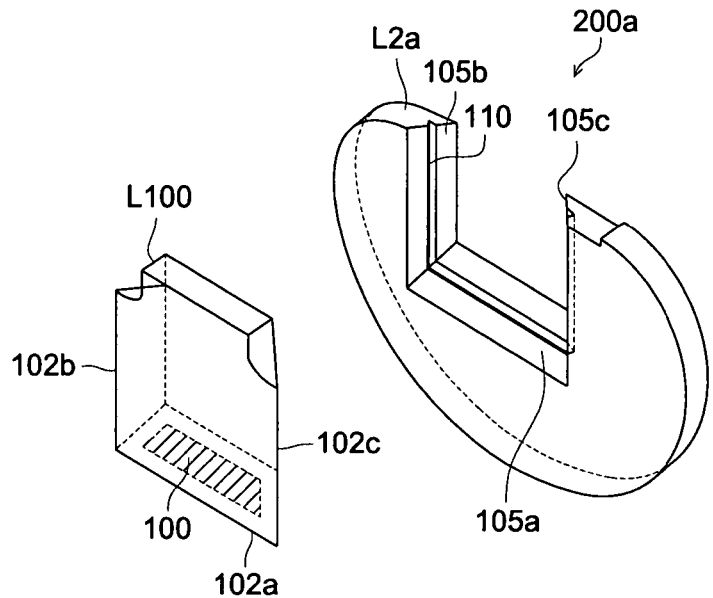
FIG. 2 (*a*) is a diagram illustrating a hologram optical substrate L100 and an optical substrate L2*a*. The hologram optical substrate L100 and the optical substrate L2*a* are unified to form a hologram-element built-in lens 200*a* in the invention.
Figure 2B:
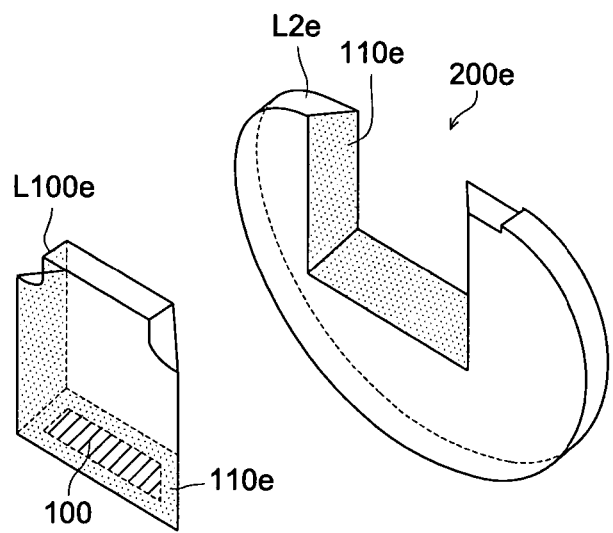

Incidentally, examples of forms of joining surfaces 102 and 105 for the first optical substrate and the second optical substrate are shown in FIG. 2 (a) and FIG. 2 (b). Cutout portion 110, a microscopic cutout portion and satin-embossed form 100e may also be formed on joining surfaces 102 and 105 in the optical substrate forming process. Further, the cutout portion 110 may also be formed on either one or both of joining surfaces of the optical substrate, so that they may be communicated with the outside. The number of cutout portions 110 to be formed is not limited in particular. Further, though a shape of the cutout portion is not limited in particular, it is preferable that the cutout portion is polygonal and/or semicircular. Owing to this, it is possible to strengthen adhesion force between optical substrates. It is further possible to spread evenly adhesive agents on the entire surface on each of joining surfaces 102 and 105 on a penetrating basis. It is also possible to reduce an amount of adhesive agents running over the lens surface.

(2) Hologram Optical Substrate Forming Process

A hologram optical substrate forming process will be explained as follows, referring to FIG. 1-FIG. 21.

The hologram optical substrate forming process includes (a) laminate sheet forming process, (b) cutting process, (c) first peeling process, (d) sticking process, (e) second peeling process, (f) exposure process and (g) developing process. Hologram element forming section 19 of hologram photosensitive material that is stuck on inclined surface 101 of optical substrate L1 is formed as hologram element 100 through (f) exposure process and (g) developing process among the aforesaid processes.

A transferring mechanism that transfers laminate sheet 5 is equipped with a roller group, a pinch roller group and a motor that is a driving source for the roller group and the pinch roller group, and this is provided in each process (not shown).

In the (a) laminate sheet forming process, a laminate sheet having a pair of protective sheets with a hologram photosensitive sheet peelably interposed between the pair of protective sheets (b) cutting process, the aforesaid hologram photosensitive sheet 2 is cut to at least the depth from the outer surface side of any one of the protective sheets in the direction of the thickness of the laminate sheet 5, and half-cutting is conducted so that hologram element forming section 19 may be formed on the aforesaid hologram photosensitive sheet 2. In the (c) first peeling process, a protective sheet on one side is peeled from hologram photosensitive sheet 2. In the (d) sticking process, hologram element forming section 19 of hologram photosensitive material is stuck on inclined surface 101 of optical substrate L1 representing the first optical substrate under the condition that the hologram element forming section 19 of hologram photosensitive material is stuck to the protective sheet on the other side. In the (e) second peeling process, the protective sheet on the other side and hologram element non-forming section 18 of hologram photosensitive material are peeled under the condition that the hologram element forming section 19 of hologram photosensitive material only is staying on the inclined surface 101 of optical substrate L1 representing the first optical substrate. In the (f) exposure process, the hologram element forming section 19 of hologram photosensitive material that is stuck on the inclined surface 101 of optical substrate L1 representing the first is exposed to laser beam after the second peeling process. In the (g) developing process, the exposed hologram element forming section 19 is developed.

If a hologram photosensitive material to be adjusted to an inclined surface of an optical substrate is tried to be cut to the predetermined form from a hologram photosensitive sheet in the darkroom, to be stuck on the inclined surface of the optical substrate and to be exposed to a laser beam one sheet by one sheet accurately, changes in shape such as wrinkles and deflections tend to be caused, because the hologram photosensitive sheet is a thin and soft gel-like photosensitive material made of composition for hologram photosensitive material and a binder. Therefore, the hologram photosensitive sheet is interposed from both sides by protective sheets having high strength through gluing agents, to be protected.

However, changes in shape such as wrinkles and deflections tend to be caused, even when peeling the protective sheet after the hologram element forming section is cut from the hologram photosensitive sheet. Further, it is very difficult to handle one piece of hologram element forming section of hologram photosensitive material adjusted to the small inclined surface of optical substrate provided on WD and HMD, and to stick it on the inclined surface of optical substrate, in the darkroom, and workability is worse, which is a problem. In contrast to this, by cutting a hologram element forming section of hologram photosensitive material through cutting hologram photosensitive material as in the present invention, it is possible to reduce wrinkles and deflections of hologram photosensitive material in the case of peeling a protective sheet, and to stick the hologram element forming section of hologram photosensitive material on the inclined surface of the first optical substrate accurately and further, to give exposure by laser to the precise position. Therefore, the effect that the precise hologram element is formed on the first optical substrate to form a hologram optical substrate, and the first optical substrate can be integrated with the second optical substrate is exhibited. Further, the effect that the productivity of the hologram element built-in lens is improved by an improvement of the yield ratio of the hologram optical substrate is exhibited.

(a) Laminate Sheet Forming

Figure 3:
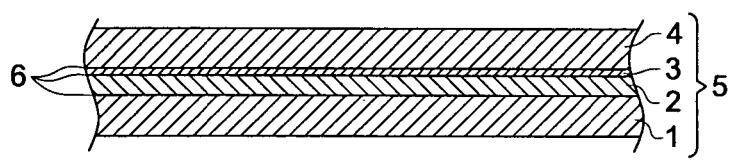
FIG. 3 is a diagram of laminate sheet 5 composed of a protective sheet and a hologram photosensitive sheet used in the invention.

FIG. 3 is a cross-sectional view of an example of laminate sheet 5 used in the invention.

The laminate sheet 5 used in the invention is formed as a laminate sheet having a pair of protective sheets with a hologram photosensitive sheet peelably interposed between the pair of protective sheets through adhesive agent. More preferably, a barrier sheet is inserted as the third protective sheet, in addition to the aforesaid paired protective sheets. Namely, in the present embodiment, a protective sheet on one side of the aforesaid paired protective sheets is stuck on the side on one side of hologram photosensitive sheet 2 to be capable of being peeled, and a barrier sheet is stuck on the side on the other side to be capable of being peeled, while, the protective sheet on the other side of the aforesaid paired protective sheets is stuck on the barrier sheet to be laminated to be capable of being peeled. Incidentally, when there is a laminate sheet conforming to the purpose in advance, a laminate sheet forming process may be skipped.

The laminate sheet 5 is of the 4-layer structure as stated above, and it is composed of a cover sheet representing the first protective sheet, hologram photosensitive sheet 2, barrier sheet 3 representing the third protective sheet and base sheet 4 representing the second protective sheet in the order from the bottom. Between these sheets, there are coated adhesive agents 6 which make these sheets to adhere closely each other, and can be peeled. It is preferable that hologram photosensitive sheet 2 is not joined to both end portions of the laminate sheet 5 in its lateral direction. The reason for this is as follows; if the hologram photosensitive sheet 2 is not joined to the aforesaid both end portions, it is possible to provide protruded portions on the cover sheet 1, the barrier sheet 3 and the base sheet 4 and a sheet can be peeled easily.

Figure 4:
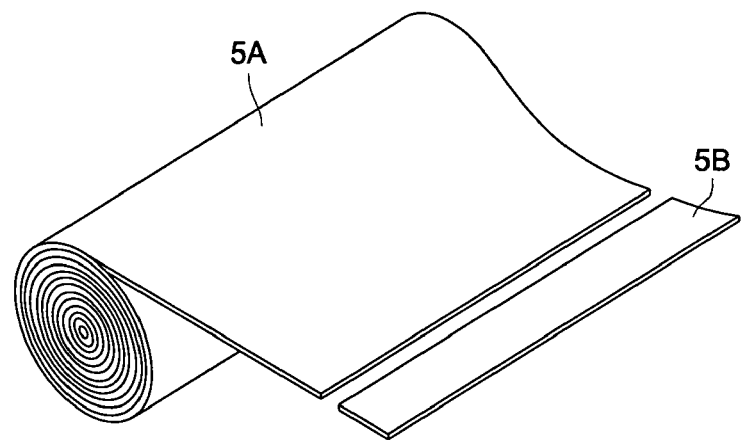
FIG. 4 is a diagram of jumbo roll body 5A of laminate sheet and strip-shaped laminate sheet 5B used in the invention.

FIG. 4 shows jumbo roll body 5A that is the sheet of the 4-layer structure wound to be in a roll shape which is an example of the laminate sheet 5. Further, as another example of the laminate sheet 5, there are given the one formed to be in a shape of pancake which is wound to be in a shape of a roll by cutting the jumbo roll body in the radial direction at a predetermined pitch width in the axial direction of the jumbo roll body, and laminate sheet 5B (hereinafter referred to as strip-shaped laminate sheet 5B) formed to be in a strip shape by cutting a jumbo-roll-shaped laminate sheet in parallel in the direction of its flank, or by cutting the pancake-shaped laminate sheet in parallel in its longitudinal direction. The laminate sheet 5 may be formed to be in any shape including those which are cut to be in a pancake shape, a strip shape, a polygon shape and a circle shape, and those wound to be in a shape of pancake after cutting.

Materials for the laminate sheet 5 will be explained.

As materials for the cover sheet 1, the barrier sheet 3 and the base sheet 4, there are given, for example, paper, plastic, glass and metal. Paper or plastic having flexibility that allows the sheet to be in a form of a roll or to be a flat shape depending on circumstances and having strength which hardly damages internal hologram photosensitive material is preferable.

As a metal, for example, there are given aluminum and stainless steel. As a plastic, for example, there are given polyester, polystyrene, polycarbonate, polyether sulfone, polyimide, polycycropentadiene, polynorbornene, nylon and cellulose acetate. As polyester, for example, there are given polyethylene terephthalate and polyethylene naphthalate.

As materials for the cover sheet 1, the barrier sheet 3 and the base sheet 4, there are given, polyethylene naphthalate and plastic containing styrene-based polymer having syndiotactic structure. Polyethylene terephthalate having moderate flexibility and strength is most preferable.

Hologram photosensitive sheet 2 is one wherein those containing chemical composition such as hologram photosensitive composition, dye composition and heat generating and heat absorbing composition and a binder are formed to be a gel-shaped sheet. The hologram photosensitive composition is composed of those containing photosensitive silver halide, non-photosensitive organic silver halide, photopolymerization agents and reducing agents. The hologram photosensitive sheet 2 includes a hologram photosensitive sheet containing hologram photosensitive composition and a binder. This hologram photosensitive sheet serves as a sheet on which hologram images are formed through laser exposure, irradiation of ultraviolet radiation and baking processing.

Listed as such binders are natural polymers, synthetic polymers, and copolymers, as well as sheet forming media. Examples include gelatin, gum Arabic, polyvinyl alcohol, hydroxyethyl cellulose, cellulose acetate, cellulose acetate butyrate, polyvinylpyrrolidone, casein, starch, polyacrylic acid, polymethyl methacrylate, polymethacrylic acid, polyvinyl chloride, copoly(styrene-maleic anhydride), copoly (styrene-acrylonitrile), copoly(styrene-butadiene), polyvinyl acetals, polyvinyl formal, polyvinyl butyral, polyesters, polyurethanes, phenoxy resins, polyvinylidene chloride, polyepoxides, polycarbonates, polyvinyl acetates, cellulose esters, and polyamide. They may be hydrophilic or hydrophobic. They may be employed in the form of a solution together with solvents in which they are soluble, or in the form of an aqueous dispersion such as latex.

It is preferable that a thickness of the cover sheet 1 representing a protective sheet that protects the outside of the laminate sheet % and of the base sheet 4 is in a range of 20 µm-200 µm, for the purpose of securing strength and flexibility for protecting hologram photosensitive sheet 2.

It is preferable that a thickness of the barrier sheet 3 representing a protective sheet that protects the hologram photosensitive sheet 2 directly is in a range of 2 µm-20 µm, for the purpose of joining the hologram photosensitive sheet 2 directly and of securing strength and flexibility for protecting hologram photosensitive sheet 2. A thickness of the hologram photosensitive sheet 2 is preferably in a range of 10 µm-30 µm.

Adhesive agents 6 to be coated between respective sheets are not limited in particular, if each sheet can be joined and stuck closely, and can be peeled. For example, there are given acrylic resin, ester acrylic resin, or its copolymer, rubberbased resin, silicon-based resin, vinyl acetate resin, urethane-based resin, acrylonitrile, hydrocarbon resin, phenol-based resin, alkylphenol resin, rosin-based resin, terpene resin, chroman indene resin, polyvinyl ether and either one of or composite of maleimide type, poly olefin type and poly vinyl ether type. Further, the so-called two-liquid crosslinking type adhesive agents for crosslinking by adding isocyanate-based crosslinking agent or metal-chelate-based crosslinking agent may also be useful.

With respect to the adhesion force of the adhesive agents 6, it is preferable that the adhesive strength between the protective sheet on the other side described later and the hologram photosensitive sheet is relatively higher than the adhesive strength between the protective sheet on one side to be given a cutout described later and the hologram photosensitive sheet. It is preferable that the adhesion force is in a range of 10 g/25 mm-100 g/25 mm in the peel test, so that both of adherence and peeling may be satisfied. Further, it is preferable that the adhesion force is in the order of the force between barrier sheet 3/hologram photosensitive sheet 2, the force between base sheet 4/barrier sheet 3 and the force between hologram photosensitive sheet 2/cover sheet 1, wherein the strongest force comes first, so that the peeling may easily take place in the order of cover sheet 1, base sheet 4 and barrier sheet 3. A thickness of the adhesive agents 6 is preferably 30 μm or less, because the total thickness of the laminate sheet can be controlled.

(b) Cutting Mechanism

Figure 5:
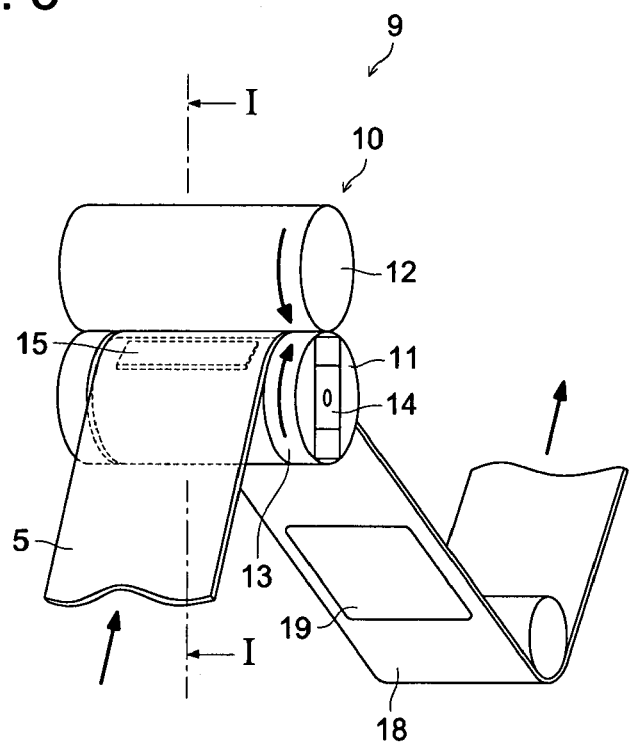
FIG. 5 shows cutting mechanism 9 used in the invention.

Each of FIG. 5 and FIG. 6 shows a schematic diagram of cutting mechanism 9.

As shown in FIG. 5 and FIG. 6, the cutting mechanism 9 is equipped with cut-off roller group 10 that forms hologram element forming section 19 on laminate sheet 5 and with a motor representing a drive source for the above. The cut-off roller group 10 is equipped with cut-off roller 11 and supporting roller 12. Between the cut-off roller 11 and the supporting roller 12, there is provided a clearance in which the laminate sheet is cut and hologram element forming section 19 is formed. On both sides of the cut-off roller 11, there are provided two column-shaped collar portions 13 which transfer the rotation of the supporting roller 12 to the cut-off roller 11, in a way to come in contact with the supporting roller 12. In the vicinity of the central portion of the side of the collar portion 13, there is provided adjusting portion 14 which can change a diameter of the collar portion 13. The clearance between the cut-off roller 11 and the supporting roller 12 is adjusted by changing a diameter of the collar portion 13 with this adjusting portion 14.

In the vicinity of the central portion on the surface of the cut-off roller 11, there is provided a cutting edge rest (not shown) that is movable vertically. This cutting edge rest is curved to follow the surface of the cut-off roller 11, and cutting edge 15 is provided on the cutting edge rest. This cutting edge 15 is curved to follow the roller surface, and is capable of being mounted on or dismounted from the cutting edge rest. The laminate sheet 5 is cut by this cutting edge 15 in the direction of its thickness, and the hologram element forming section 19 is formed. Further, this cutting edge rest can adjust a distance of vertical movement with adjustment portion 14. By adjusting a distance of vertical movement of the cutting edge rest, it is possible to adjust a depth of cutting of a hologram element forming section formed on the laminate sheet 5, and to form a half-cutting section 20 or non-cutting section 21 by causing the laminate sheet 5 to be in a half-cutting state or in non-cutting state along the contour line of the cutting edge 15.

Figure 8:
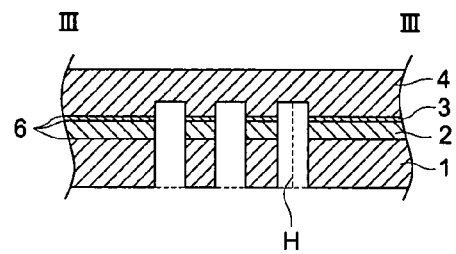
FIG. 8 is a cross-sectional view taken on line III-III in FIG. 7 (*b*).
Figure 9:
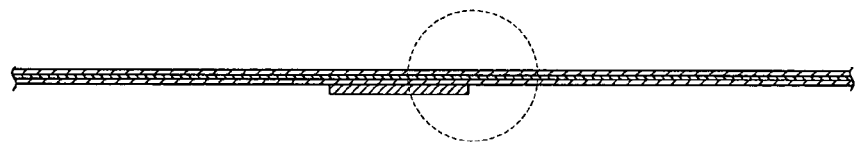
FIG. 9 is a cross-sectional view taken on line II-II in FIG. 7 (*b*).
Figure 9:
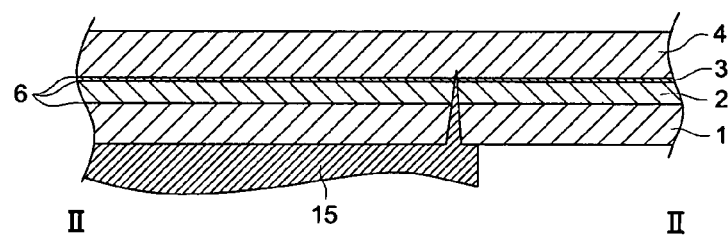

Though each of FIG. 7 (a)-FIG. 7 (c) shows an example of a contour line for the hologram element forming section 19 thus formed and hologram element non-forming section 18, the invention is not limited to the illustration in particular. Further, each of FIG. 8 and FIG. 9 shows a cross-sectional view of FIG. 7 (b).

The half-cutting section 20 is formed by cutting along a contour line of the hologram element forming section 19 of hologram photosensitive material from the outer surface side of either one of cover sheet 1 representing a protective sheet and base sheet 4 in the direction of a thickness of laminate sheet 5 with at least the depth at which the hologram photosensitive sheet 2 is cut.

Though the contour line of the half-cutting section 20 may be in a polygonal form or an oval form, and it is not limited in particular, a shape corresponding to inclined surface 101 of optical substrate L1 is preferable, because hologram element 100 can form images which are free from shifting. When the inclined surface 101 of optical substrate is in a form of a square, it is preferable that a form of cutting is substantially a square form.

A dimension of a thickness in this case means distance H from the outer surface side of laminate sheet 5 to the tip of the cutout cut by cutting edge 15 in the direction of the thickness of the laminate sheet 5 from either one of the protective sheets. The half-cutting section 20 is a portion which is cut by the tip of the cutting edge 15 to at least the depth to which the hologram photosensitive sheet 2 is cut in the direction of a thickness of the laminate sheet 5 from the outer surface side of either one of the cover sheet 1 and the base sheet 4, while, the non-cutting section 21 is a portion wherein the cover sheet 1 is cut to the depth where the cover sheet 1 is not cut at all or is cut to arrive at a part.

It is preferable to form the half-cutting section 20 by cutting it continuously along the contour line of hologram element forming section 19 of the hologram photosensitive material, as shown in FIG. 7 (a).

Or, the half-cutting section 20 and the non-cutting section 21 are formed by cutting the laminate sheet 5 with cutting edge 15 along the contour line of the hologram element forming section 19 of hologram photosensitive material, as shown in FIG. 7 (b), FIG. 7 (c), FIG. 8 and FIG. 9. It is preferable to form the half-cutting section 20 and the non-cutting section 21 at regular intervals as shown in FIG. 7 (b), namely, to form the half-cutting section 20 by cutting continuously in the form of perforations along the contour line of the hologram element forming section 19 of hologram photosensitive material. By forming the half-cutting section 20 to be in a form of perforations continuously along the contour line of the hologram element forming section 19 of hologram photosensitive material, it is possible to take up an area that corresponds to hologram element forming section 19 of cover sheet 1 in the case of peeling cover sheet 1 and an area that corresponds to hologram element non-forming section 18 simultaneously with a take-up roller, in the first peeling process in the post processing. Namely, when peeling the protective sheet on one side from the hologram photosensitive material, it is possible to cause a hologram photosensitive material including hologram element forming section 19 capable of being stuck on optical substrate 1 to remain on the side of the protective sheet on the other side, while peeling the protective sheet on one side entirely. Further, in the second peeling process in the post processing, it is possible to stick the hologram element forming section 19 of hologram photosensitive material with barrier sheet 3 on optical substrate L1 and thereby to cause hologram element non-forming section 18 of hologram photosensitive material to be peeled.

Further, it is preferable that the contour line of the non-cutting section 21 is shorter than the contour line of the half-cutting section 20 in terms of the total length. The reason for this is as follows; after the hologram photosensitive material 2 is stuck on optical substrate L1 through the process for sticking the hologram photosensitive sheet 2, the hologram element non-forming section 18 of the hologram photosensitive material can be peeled easily from the hologram element forming section 19 together with base sheet 4 that peels from the hologram element forming section 19.

In this case, it is preferable that the ratio of the total length of the non-cutting section 21 to that of the half-cutting section 20 is in a ratio of $1\times10^{-1}$-$1\times10^{-6}$, when assuming that the total length of the half-cutting section 20 is 1. Further, the ratio for the non-cutting section 21 is preferably in a ratio of $1\times10^{-3}$-$1\times10^{-5}$.

Further, it is preferable to form so that non-cutting section 21 may be provided on either one of sides existing in the longitudinal direction of laminate sheet 5 in the half-cutting section 20. It is further preferable to form so that a non-cutting section may be provided at the position on the upstream side in the direction of peeling of the protective sheet on one side. By peeling cover sheet 1 or base sheet 4 representing a protective sheet on one side from the non-cutting section 21 side in the longitudinal direction, when the protective sheet on one side is peeled, hologram element forming section 19 of cover sheet 1 surrounded by the half-cutting section 20 and hologram element non-forming section 18 can be connected each other at non-cutting section 21 to be peeled. Therefore, it is not necessary to divide cover sheet 1 into hologram element forming section 19 and hologram element non-forming section 18 and to peel twice as in the past, resulting in the simultaneous peeling, which is an effect.

Further, by peeling hologram element non-forming section 18 in the longitudinal direction from the side opposite to the non-cutting section 21 side after the hologram element forming section 19 of hologram photosensitive material is stuck on optical substrate L1, it is possible to peel base sheet 4 representing the protective sheet on the side of the outer surface on the other side, hologram element non-forming section 18 of hologram photosensitive material and hologram element non-forming section 18 of barrier sheet 3 representing an inner protective sheet of hologram photosensitive sheet 2, under the condition that the hologram element forming section 19 of hologram photosensitive material only remains on inclined surface 101 of optical substrate L1. Further, wrinkles and deflections of hologram photosensitive sheet 2 are hardly caused during peeling process, because the half-cutting section 20 can be peeled easily due to the total length of the contour line thereof which is long.

It is preferable that a depth of cutting in the direction of a thickness of laminate sheet 5 in half-cutting section 20 by cutting edge 15 is that with which, at least, the hologram photosensitive sheet 2 is cut from the outer surface side on either of cover sheet 1 of the protective sheet or base sheet 4, and further, with which the cutting edge 15 reaches a part of the protective sheet on the other side.

An adjustment is made by adjusting section 14 so that cutting may be carried out to the depth with which cover sheet 1 representing a protective sheet on one side, hologram photosensitive sheet 2 and barrier sheet 3 are cut, and at which a part of base sheet 4 representing a protective sheet on the other side arrives. Owing to this, it is possible to peel only hologram element non-forming section 18 of hologram photosensitive material easily without causing wrinkles and deflections on hologram element forming section 19 of hologram photosensitive material.

In this case, it is more preferable that the tip of the cutting edge 15 is put in from the thickness direction of cover sheet 1 to the depth corresponding to 10%-80% of base sheet 4. By cutting to the depth at which the cutting edge 15 arrives at a part of base sheet 4 from the thickness direction, it is possible to make hologram element forming section 19 of hologram photosensitive material only to remain on inclined surface 101 of optical substrate L1 while removing hologram element non-forming section 18 of hologram photosensitive material which has fallen into disuse, when peeling a protective sheet on the other side, after sticking hologram element forming section 19 on optical substrate L1. Due to this, it is possible to conduct a process to peel hologram element non-forming section 18 of hologram photosensitive material and a process to peel hologram element non-forming section 18 of base sheet 4 and hologram element forming section 19 in a single process.

In this case, it is more preferable that the tip of the cutting edge 15 is put in from the thickness direction of cover sheet 1 to the depth corresponding to 20%-80% of base sheet 4. Owing to this, when peeling a cover sheet on the other side, it is possible to form highly accurate hologram element 100 without causing hologram element forming section 19 of hologram photosensitive material which is stuck on inclined surface 101 of optical substrate L1 to come up or make a void. This is because base sheet 4 is not cut to be separated into hologram element forming section 19 and hologram element non-forming section 18 by tensile force of peeling roller 33 in the case of peeling hologram element non-forming section 18 of hologram photosensitive material.

In this case, it is more preferable that the tip of the cutting edge 15 is put in from the thickness direction of cover sheet 1 to the depth corresponding to 30%-70% of base sheet 4. The reason for this is as follows; hologram element non-forming section 18 of hologram photosensitive material which is stuck on the formed base sheet 4 can be peeled easily from hologram element forming section 19 of hologram photosensitive material when half-cutting section 20 of the formed base sheet 4 is bent along a surface of peeling roller 33. In this case, it is more preferable that a tip of the cutting edge is put in from the thickness direction of cover sheet 1 to cut in to the depth corresponding to 30%-50% of base sheet 4.

Figure 10:
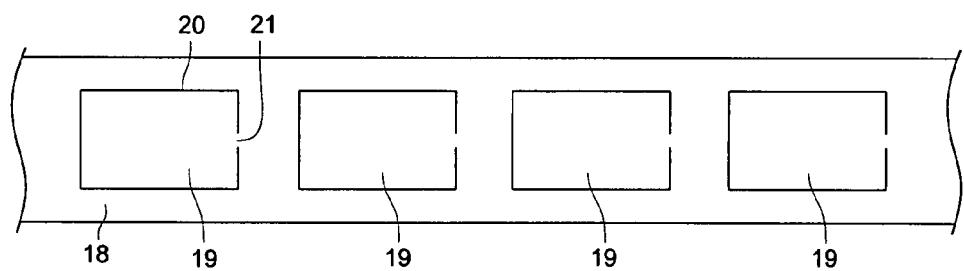
FIG. 10 is a diagram wherein a plurality of half-cut portions 20 are formed on a strip-shaped laminate sheet in the invention.

Incidentally, when forming half-cutting section 20, it is preferable that a plurality of hologram element forming sections 19 are formed in a single direction at predetermined intervals in the longitudinal direction of strip-shaped laminate sheet 5B by forming it as shown in FIG. 10. By doing this, it is possible to form a plurality of hologram element forming sections 19 continuously and efficiently, and to form a plurality of hologram elements 100 continuously and efficiently, thus, productivity is improved. Namely, a plurality of accurate hologram elements can be formed on hologram optical substrate, because a plurality of hologram element forming sections of hologram photosensitive material can be formed to be stuck on a plurality of first optical substrates in succession, which is an effect. Further, the effect that the productivity of the hologram element built-in lens is improved by an improvement of the yield ratio of the hologram optical substrate is exhibited.

In this case, the strip-shaped laminate sheet further includes one wherein half-cutting sections 20 are formed on jumbo roll body 5A and on pancake-shaped laminate body by the aforesaid cutting mechanism 9, and they are formed to be strip-shaped laminate sheets 5B through cutting.

Incidentally, a cutting plate can be used in place of cutting roller 11. On the cutting plate, there is provided a flat cutting edge on the side facing a supporting roller, and it is provided to move almost horizontally for the rotation of the supporting roller. Under the cutting plate, there are provided a roller group for moving the cutting plate, and this roller group is arranged to obtain driving from the supporting roller.

In addition to cutting by the rotation of the roller, it is also possible to give cutting to laminate sheet 5 by using a cutting edge from the upper part and/or the lower part through a press method.

In this case, a form of cutting by cutting edge 15 is the same as the cutting form formed by the aforesaid cutting edge 15. Further, a shape of half-cutting section 20 and that of non-cutting section 21 are the same as those mentioned above.

(c) First Peeling Mechanism

Each of FIG. 11-FIG. 14 shows first peeling mechanism 30 schematically.

The first peeling mechanism 30 is an peeling mechanism equipped with a neutralizing device which is composed of peeling roller 33, conductive member 39, neutralizing liquid sprayer 32 and of take-up roller 44 that takes up coversheet 1 while peeling it from hologram photosensitive material sheet 2. The peeling roller 33, the conductive member 39 and the take-up roller 44 are grounded, and they function as a neutralizing device.

Figure 11:
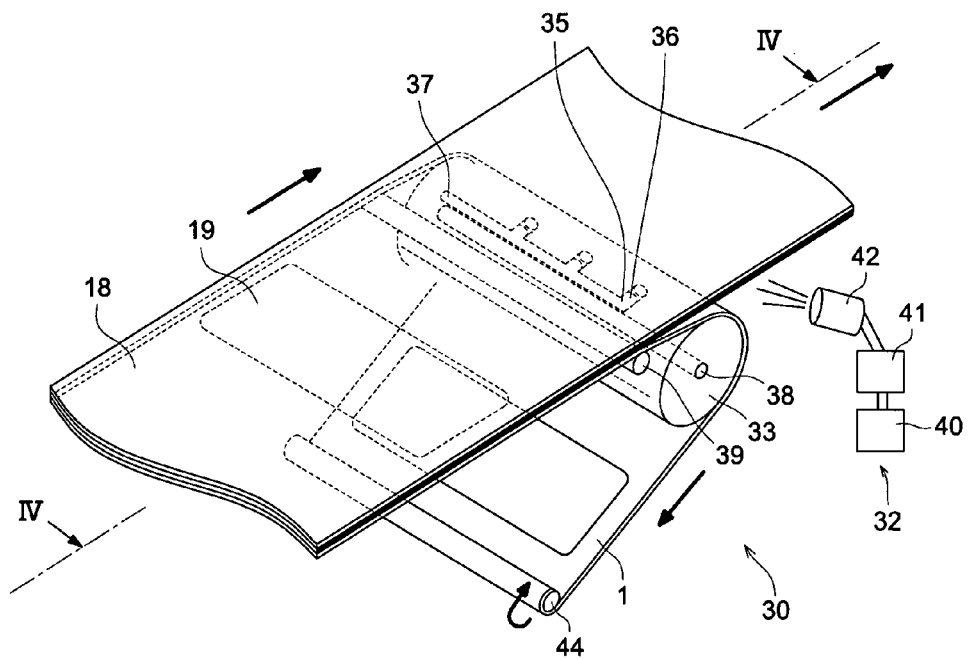
FIG. 11 is a schematic diagram of first peeling mechanism 30 used in the invention.
Figure 12:
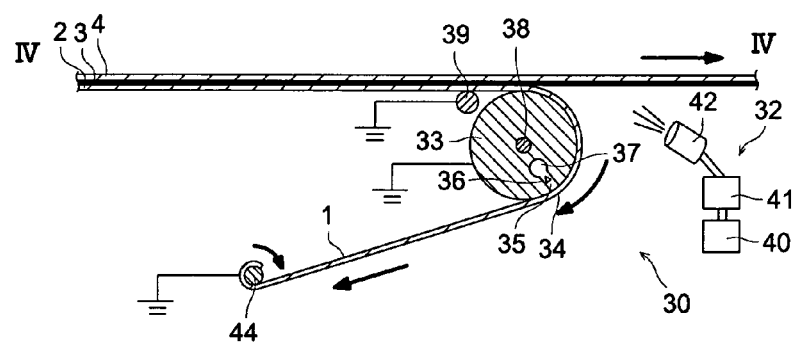
FIG. 12 is a cross-sectional view taken on line IV-IV of the first peeling mechanism 30 used in the invention.
Figure 14:
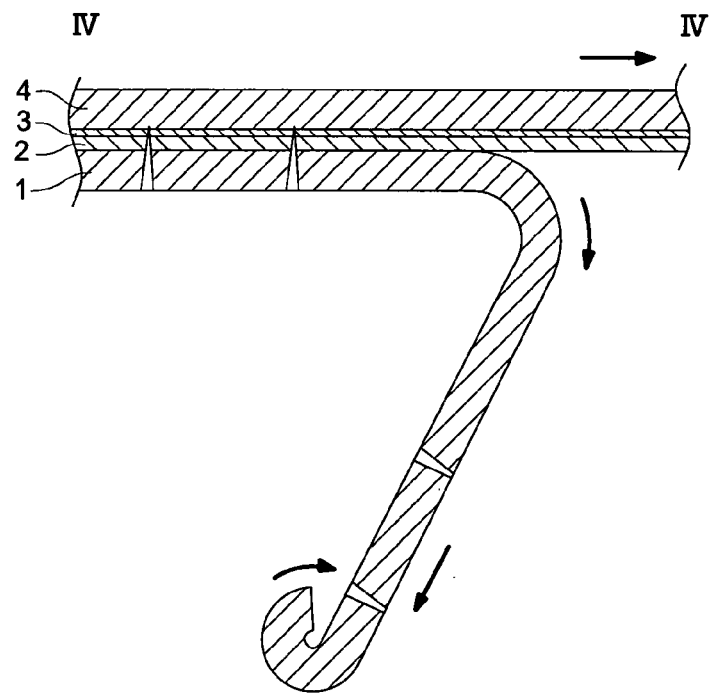
FIG. 14 is a schematic diagram of each sheet peeled by the first peeling mechanism 30 used in the invention.

As shown in FIG. 11, FIG. 12 and FIG. 14, there is provided peeling roller 33 that sucks the outer surface side of cover sheet 1 representing a protective sheet on one side from laminate sheet 5 to separate and lead the cover sheet 1. In this case, an area where the protective sheet is peeled from hologram photosensitive sheet 2 by the peeling roller is called a peeling section.

On a surface of the peeling roller 33, there is provided suction hole 34 through which the outer surface side of the protective sheet is sucked to be stuck on the roller surface closely to be peeled from the hologram photosensitive material sheet 2. On the outer circumference portion of the suction hole 34, there is provided a groove in which a gasket is pressed (not shown). Further, to this suction hole 34, there is connected suction path 35 which is extended to the roller surface with the neighborhood of the roller shaft 38 serving as an end of the path. On the halfway of this suction path 35, there is provided one-way valve 36 for preventing that suction force for laminate sheet 5 is reduced. To the end of the suction path 35, there is connected gathering suction path 37 that is provided on the vicinity of roller shaft 38 to be substantially parallel with the roller shaft 38. To the end of the gathering suction path 37, there is connected a suction pump (not shown).

On the first peeling mechanism 30, there is further arranged take-up roller 44 representing a device to pull cover sheet 1 that is a protective sheet on one side peeled from laminate sheet 5. This take-up roller 44 may also be provided with conductive member 39. It is also possible to fix an end portion of cover sheet 1 to be started in terms of take-up on take-up roller 44 by means of adhesion with an adhesive double-coated tape or of direct fixing, and to separate cover sheet 1 representing a protective sheet from laminate sheet 5 to conduct neutralizing while taking up with the take-up roller 44.

Further, it is preferable that the first peeling mechanism 30 is provided with a device to pull an end in the transfer direction of a laminate sheet from which the cover sheet 1 is peeled. The reason for the above is to make the peeling of the cover sheet 1 by peeling roller 33 to be easy.

Conductive member 39 to be grounded may also be provided on the portion which is in contact with cover sheet 1 representing a protective sheet in the vicinity of a peeling section and/or base sheet 4. A single or plural conductive members 39 may be provided on the portion that is in contact with cover sheet 1 and/or base sheet 4.

In the meantime, a surface of the peeling roller 33 may also be covered by a material that is the same as that of the conductive member 39. Further, the conductive member 39 may be provided at least on a part of the surface of the peeling roller 33, and a protective sheet may be provided to come in contact with the aforesaid part, and the peeling roller 33 itself may also be the conductive member 39. By providing the conductive member, it is possible to reduce generation of electrostatic discharge, and thereby, to control chemical changes such as solarization of hologram photosensitive material sheet 2, which is an effect.

As a form of the conductive member 39, there are given a roller form, a bar form, a board form or a reed blind form, and it is preferable that a surface that is in contact with laminate sheet 5 is formed to be broad. With respect to the reed blind form, it is preferable that the reed blind form is provided to swing on the pin shaft on the upper part when the reed blind form touches laminate sheet 5. With respect to the roller form it is preferable that the roller form is provided to rotate on the roller shaft at the center when the roller form touches laminate sheet 5.

As a material for the conductive member 39, a material having high conductivity is preferable, and a metal, a conductive fiber, conductive plastic and conductive paper are given. In particular, a metal is preferable because its conductivity is high, and as that metal, copper, silver, aluminum, iron, gold, platinum and alloy thereof are preferable.

On the neutralizing liquid sprayer 32, there are provided neutralizing liquid generator 40, fan 41 that adjusts an amount of neutralizing liquid generated and spraying nozzle 42 that sprays neutralizing liquid against a peeling surface of the sheet. The neutralizing liquid generator 40 that generates neutralizing liquid of positive or negative ion is connected to the fan 41 that transfers neutralizing liquid through a liquid path. Further, this fan 41 is connected to the spraying nozzle 42 through the liquid path. This spraying nozzle 42 is arranged so that it may spray neutralizing liquid in the longitudinal direction or in the lateral direction of the laminate sheet 5.

By spraying neutralizing liquid from the spraying nozzle 42 to a space between sheets to be peeled, or to a cutting surface where the hologram element forming section 19 is in contact with the hologram element non-forming section 18, it is possible to reduce generation of electrostatic discharge, and thereby, to control chemical changes such as solarization of hologram photosensitive material sheet 2, and by adjusting a running speed of neutralizing liquid, it is possible to assist peeling of sheets and thereby, to reduce wrinkles, deflections and lifting which are caused on hologram photosensitive materials, which is an effect.

As the neutralizing liquid generator 40, there is given one of a corona discharge type or one of a soft X-rays type. It is preferable to increase the number of installations of spraying nozzles 42 or to make a bore diameter of the spraying nozzles 42 to be smaller, because it is possible to enhance a neutralizing effect of sheet peeling surfaces and to assist peeling supplementarily.

Incidentally, though it is preferable that a suction mechanism such as suction hole 34 is provided so that cover sheet 1 and hologram photosensitive sheet 42 may be peeled more, establishment of the suction mechanism is not mandatory.

Figure 13:
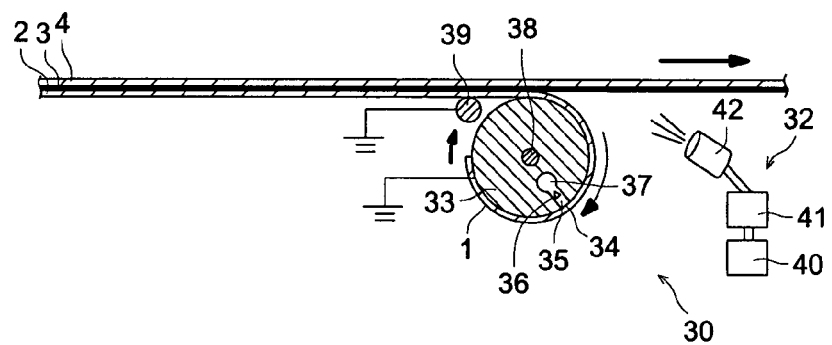
FIG. 13 is a schematic diagram of first peeling mechanism 30 used in the invention.

Further, as shown in FIG. 13, peeling roller 33 may function as a neutralizing device so that it can peel cover sheet 1 representing a protective sheet from laminate sheet 5, without providing take-up roller 44. In this case, an edge portion of the cover sheet 1 representing a protective sheet for starting taking up is fixed to the peeling roller 33 through adhesion or direct fixing. As a neutralizing device, there are provided peeling roller 33, conductive member 39 and neutralizing liquid sprayer 32.

(d) Sticking Mechanism

Figure 15:
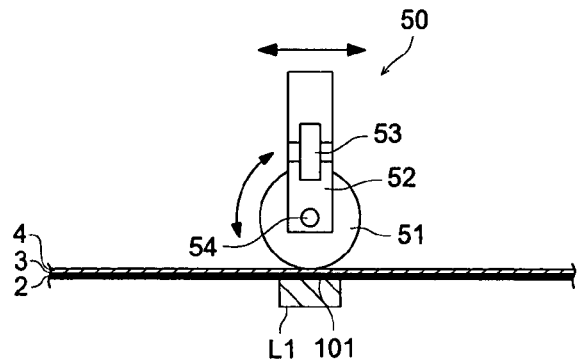
FIG. 15 is a schematic diagram of sticking mechanism 50 used in the invention.
Figure 16:
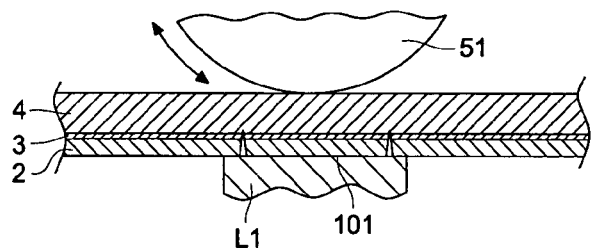
FIG. 16 is an enlarged diagram of a sticking portion for a hologram photosensitive material and an optical substrate of the sticking mechanism 50 used in the invention.

Each of FIGS. 15 and 16 shows schematically a sticking mechanism.

Sticking mechanism 50 is composed of sticking roller 51 that applies pressure for sticking on inclined surface 101 of optical substrate L1 under the circumstances where hologram element forming section 19 of hologram photosensitive material is stuck on base sheet 4 representing a protective sheet on the other side, supporting member 52 that supports the sticking roller 51 and elastic member 53 that adjusts pressure by the sticking roller 51. On the center of the sticking roller 51, there is provided roller shaft 54 that rotates the sticking roller 51. On both sides of the roller shaft 54, there are provided supporting members 52 and 53 which support the sticking roller 51. Elastic members 53 and 53 are provided on the center portions of the supporting members 52 and 52. This elastic member 53 can adjust the pressure when applying pressure, from the upper side, on hologram element forming section 19 of hologram photosensitive material through base sheet 4. As the elastic member 53, there are given a cylinder and a spring. Further, it is preferable that a fixing member for fixing optical substrate L1 is provided.

(e) Second Peeling Mechanism

Figure 17:
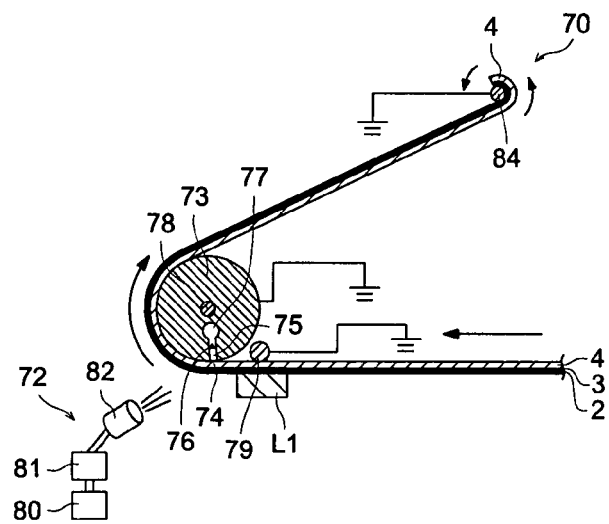
FIG. 17 is a schematic diagram of second peeling mechanism 70 used in the invention.
Figure 18:
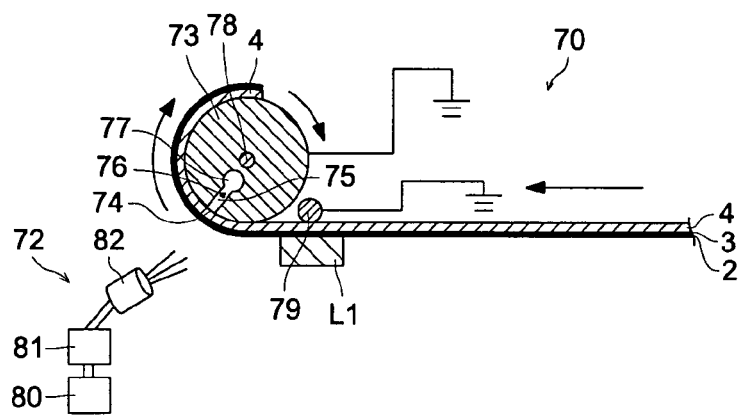
FIG. 18 is a schematic diagram of second peeling mechanism 70 used in the invention.
Figure 19:
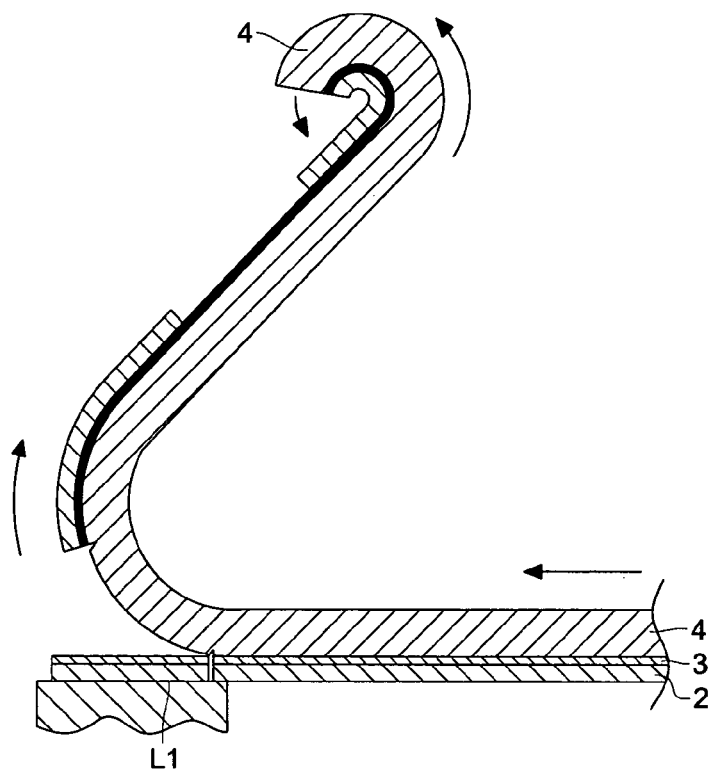
FIG. 19 is a schematic diagram of each sheet peeled by the second peeling mechanism 70 used in the invention.

Each of FIGS. 17-19 shows schematically the second peeling mechanism 70.

The second peeling mechanism 70 is an peeling mechanism equipped with a neutralizing device which has the same structures and functions as those of the first peeling mechanism 30 except that arrangements of the peeling roller 33, the grounded conductive member 39, the neutralizing liquid sprayer 32 and the take-up roller 44 are different.

The second peeling mechanism 70 is composed of the peeling roller 73, conductive member 79, and take-up roller 74. Further, the peeling roller 73 is equipped with suction hole 74, suction path 75, roller shaft 78, suction path 75, gathering suction path 77 and one-way valve 76.

Neutralizing liquid sprayer 72 is composed of neutralizing liquid generator 80, fan 81 and spraying nozzle 82.

In the meantime, the second peeling mechanism can peel base sheet 4 representing a protective sheet on the other side and hologram element non-forming section 18 of hologram photosensitive material from hologram element forming section 19 of hologram photosensitive material, without providing a suction mechanism. As a neutralizing device, there are provided peeling roller 73, conductive member 79 and neutralizing liquid sprayer 72.

Further, as shown in FIG. 18, peeling roller 73 may function as a neutralizing device so that it can peel base sheet 4 representing a protective sheet on the other side from hologram element forming section 19 of hologram photosensitive material without providing take-up roller 84.

(f) Exposure Mechanism

Figure 20:
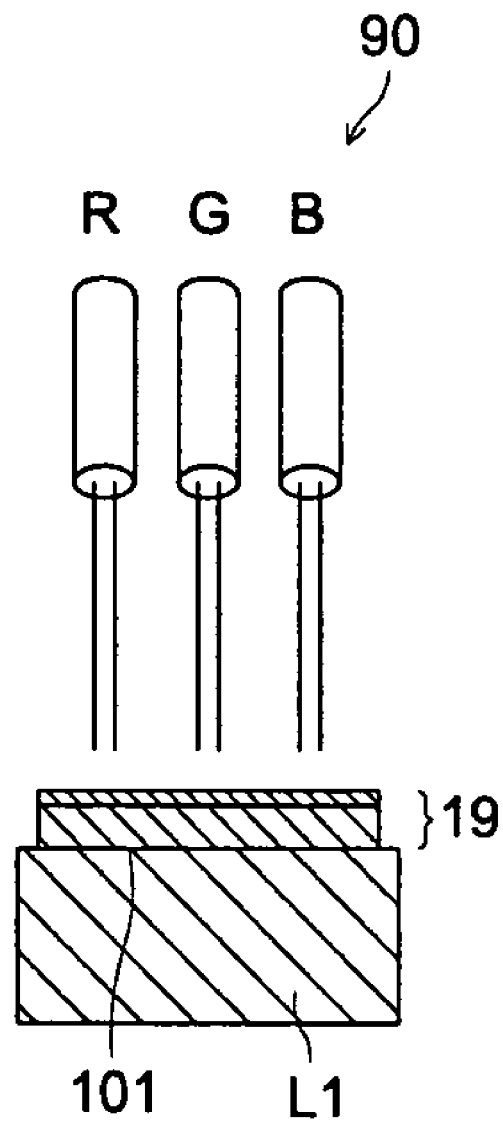
FIG. 20 is a schematic diagram of exposure mechanism 90 used in the invention.
Figure 21:
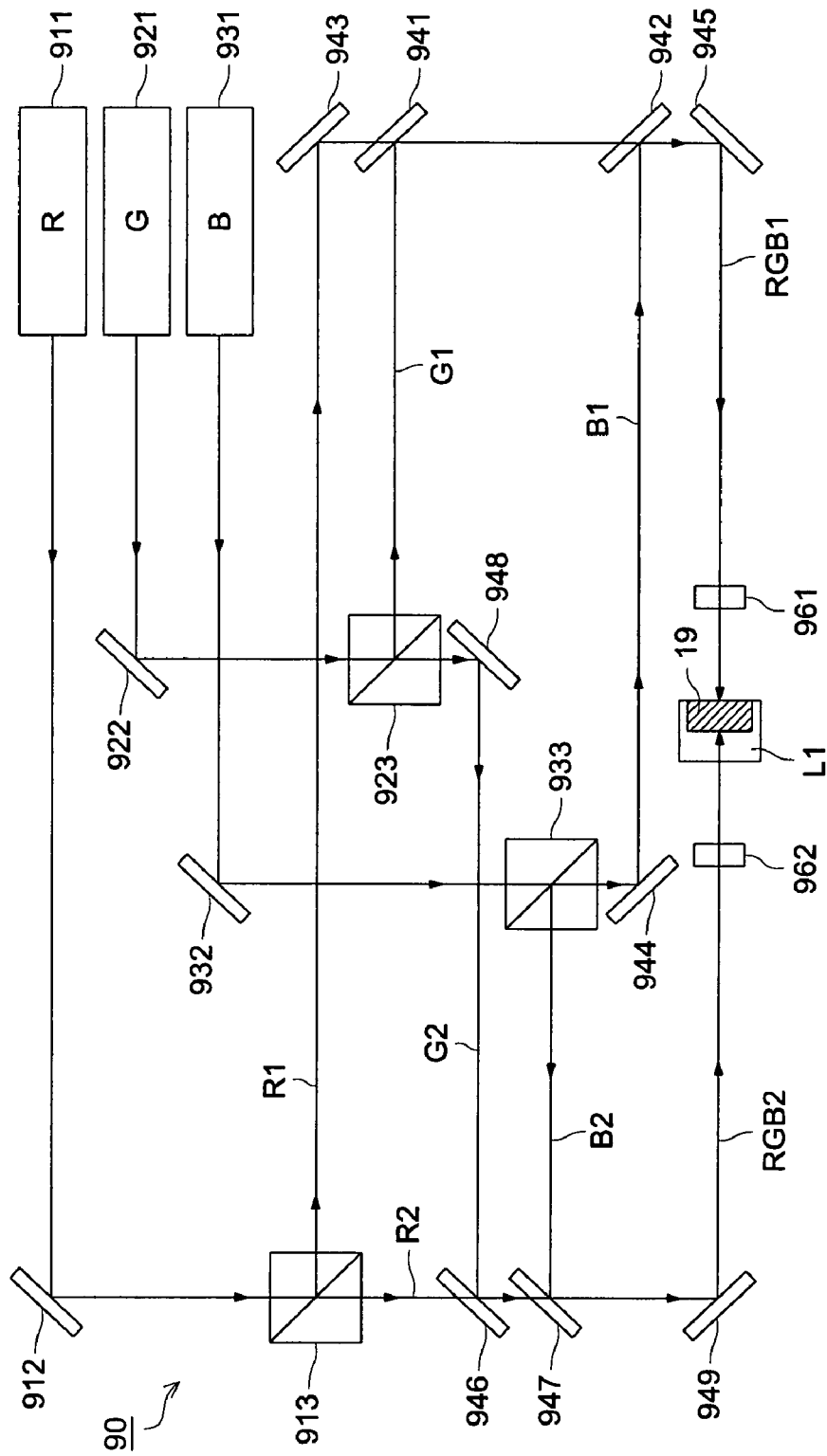
FIG. 21 is a channel diagram of the exposure mechanism 90 used in the invention.
Figure 22:
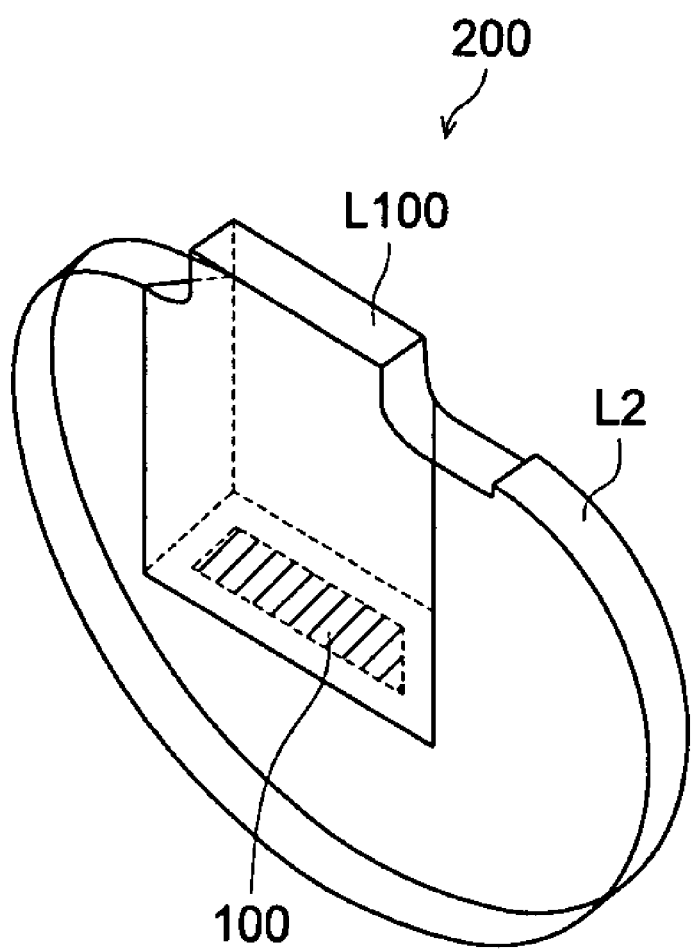
FIG. 22 shows hologram-element built-in lens 200 in the invention.

Each of FIGS. 20 and 21 shows schematically the exposure mechanism 90.

The exposure mechanism 90 is composed of a laser exposure section and others. On the laser exposure section, there are provided laser oscillators 911, 921 and 931 which emit laser beams respectively of red, green and blue (RGB) each giving exposure of interference fringes to hologram element forming section 19 of hologram photosensitive material, reflection mirrors each giving exposure of a laser beam with predetermined wavelength at a predetermined position of hologram element forming section 19 of hologram photosensitive material among laser beams from oscillators 911, . . . , sitters, variable beam splitters and reflection mirrors.

The variable beam splitters 913, 923 and 933 are arranged on the optical axis for laser exposure from laser oscillators 911, 921 and 931 each being provided with a laser light source. Further, each of the variable beam splitters 913, 923 and 933 separates a laser beam into reference light RGB1 and subject light RGB2. Shutters 961 and 962 each intercepting hologram element forming section 19 of hologram photosensitive material stuck on inclined surface 101 of optical substrate L1 irradiated by reference light RGB1 and subject light RGB2 are provided.

In optical paths respectively for the reference lights R1, G1 and B1, there are arranged dichroic mirrors 941 and 942, and total reflection mirrors 943, 944 and 945 respectively which change traveling directions of the reference lights R1, G1 and B1. Each of the dichroic mirrors 941 and 942 color-synthesizes reference lights R1, G1 and B1 into reference light RGB1 which enters hologram photosensitive material through the total reflection mirror 945.

In optical paths respectively for the subject lights R2, G2 and B2, there are arranged dichroic mirrors 946 and 947, and total reflection mirrors 948 and 949 respectively which change traveling directions of the subject lights R2, G2 and B2. Each of the dichroic mirrors 946 and 947 color-synthesizes subject lights R2, G2 and B2 into subject light RGB2 which enters hologram photosensitive material through the total reflection mirror 949.

Laser oscillator 911 having a wavelength of about 647 nm as a red laser beam is preferable, and Kr laser, for example, can be used. Laser oscillator 921 having a wavelength of about 532 nm as a green laser beam is preferable, and YAG laser, for example, can be used. Laser oscillator 931 having a wavelength of about 447 nm as a blue laser beam is preferable, and Ar laser, for example, can be used.

(g) Developing Mechanism

The developing mechanism is composed of a UV irradiation section and a bake processing section (not shown). On the UV irradiation section, there are provided irradiating devices such as UV, a mercury-vapor lamp, a black light, a fluorescent lamp and a diode. The reason for the above is to form hologram element forming section 19 of hologram photosensitive material stably into hologram element 100 through irradiation by the irradiating devices, and to fix inclined surface 101 of optical substrate L1 and hologram element forming section 19 of hologram photosensitive material together with adhesive agents. On the bake processing section, there is provided a thermostatic device that maintains constant temperature to volatilize volatile substances existing in a binder and to fix hologram element forming section 19 of hologram photosensitive material and inclined surface 101 of optical substrate L1 together by the use of adhesive agents.

Functions of the hologram optical substrate forming process including a hologram element forming process will be explained.

A mechanism of (a) laminate sheet forming forms a pancake-shaped and strip-shaped laminate sheet 5B that is wound to be in a shape of jumbo roll body 5A or in a shape of a roll cake.

Next, (b) cutting process will be explained, referring to FIG. 5-FIG. 10.

As shown in FIG. 5 and FIG. 6, a transfer mechanism transfers laminate sheet 5 to cutting mechanism 9. When supporting roller 12 rotates, cut-off roller 11 rotates from collar portion 13. Owing to rotations of the cut-off roller 11 and the supporting roller 12, the laminate sheet 5 transferred passes through a gap between the supporting roller 12 and the cut-off roller 11. When the laminate sheet 5 passes, cutting edge 15 cuts to the predetermined depth from the thickness direction of a protective sheet on one side of the laminate sheet 5, and forms hologram element forming section 19 of hologram photosensitive material and hologram element non-forming section 18.

Adjusting portion 14 adjusts a diameter of the collar portion 13 of the cut-off roller 11 and a vertical position of the cutting edge rest, depending on the thickness of the laminate sheet 5 transferred. Owing to this, it is possible to cut with cutting edge 15 while putting in the tip of the cutting edge 15 to the depth of the predetermined thickness dimension of the protective sheet. This cutting edge 15 makes it possible to form half-cutting section 20 and non-cutting section 21 which are cut along the contour line of hologram element forming section 19 of hologram photosensitive material, on the laminate sheet 5.

By changing the cutting edge 15, it is possible to change a shape of hologram element forming section 19 and to change a shape of half-cutting section 20. In this case, in the case of FIG. 7a, the half-cutting section 20 is formed by cutting continuously along the contour line of hologram element forming section 19 of hologram photosensitive material. In the case of FIG. 7b, the half-cutting section 20 is formed by cutting to be continuous perforations along the contour line of hologram element forming section 19 of hologram photosensitive material. In the case of FIG. 7c, the half-cutting section 20 is formed by providing non-cutting section 21 on either one side existing in the longitudinal direction of the laminate sheet 5 in the half-cutting section 20 along the contour line of hologram element forming section 19 of hologram photosensitive material.

Further, as shown in FIG. 10, when rotating cut-off roller 11 continuously, or when providing plural cutting edges 15, a plurality of half-cutting sections 20 may also be formed in the longitudinal direction of the laminate sheet 5 at predetermined intervals.

The laminate sheet 5 on which the half-cutting section 20 has been formed is transferred to the first peeling device by a transfer device.

(c) The First Peeling Process Will be Explained as Follows, Referring to FIG. 11-FIG. 14.

The transfer mechanism transfers the laminate sheet 5 on which the hologram element forming section 19 of hologram photosensitive material is formed in the lower direction to the first peeling mechanism 30. With respect to the peeling roller 33, the outer surface side of cover sheet 1 representing peeling sheet on one side of a protective sheet touches suction hole 34, whereby, the suction pump operates to make gathering suction path 37 and suction path 35 to be in the vacuum state, and the suction hole 34 sucks the outer surface side of the cover sheet 1.

In this case, the peeling roller 33 rotates around roller shaft 38 to peel the cover sheet 1 that is sucked to contact closely from hologram photosensitive material sheet 2, and leads the cover sheet 1 representing a protective sheet in the direction of the peeling. Take-up roller 44 representing a device to pull starts taking up beginning with an end portion of the cover sheet 1 which has been led. When the take-up roller 44 rotates, the cover sheet 1 is peeled from hologram photosensitive material sheet 2. In particular, in the case of FIG. 7c, it is preferable that the cover sheet 1 representing a protective sheet on one side is peeled from non-cutting section 21 in the longitudinal direction of the laminate sheet 5.

In the neutralizing process for neutralizing static electricity generated on the peeling portion in the case of peeling of the protective sheet, grounded peeling roller 33, take-up roller 44, conductive member 39 and neutralizing liquid sprayer 32 are used. Incidentally, each of the grounded peeling roller 33 and the take-up roller 44 has the same function and effect as those of the conductive member 39, and functions also as a conductive member.

The peeling roller 33 grounded in the case of peeling of the protective sheet, take-up roller 44 and conductive member 39 come in contact with an outer surface side of the cover sheet 1 representing a protective sheet existing near the peeling portion or of the base sheet 4, in the case of peeling of the cover sheet 1 of a protective sheet, to conduct neutralizing.

Further, the neutralizing liquid sprayer 32 causes neutralizing liquid generator 40 to generate neutralizing liquid, then, adjusts the speed of flow with fan 41 and sprays neutralizing liquids from spraying nozzle 42 against cover sheet 1 representing a protective sheet near the peeling portion or base sheet 4 and/or hologram photosensitive sheet 2, in the case of peeling of the cover sheet 1 representing a protective sheet on one side. Owing to this, generation of static electricity in the case of sheet peeling is reduced, and peeling of peeling roller 33 is assisted.

Incidentally, as shown in FIG. 13, it is also possible to take up a cover sheet representing a protective sheet by peeling it from the laminate sheet 5 while conducting neutralizing with rotation of peeling roller 33, by fixing an end portion to start taking up on the peeling roller 33 through adhesion or direct fixing, without providing take-up roller 44.

(d) A sticking process will explained as follows, referring to FIG. 15 and FIG. 16.

The transfer mechanism transfers hologram element forming section 19 of hologram photosensitive material and hologram element non-forming section 18 to sticking mechanism 50 under the circumstances where the hologram element forming section 19 of hologram photosensitive material and hologram element non-forming section 18 are stuck on base sheet 4 representing a protective sheet on the other side. The hologram element forming section 19 of hologram photosensitive material is arranged to the position where it is stuck on inclined surface 101 of optical substrate L1. After the arrangement, sticking roller 51 existing on the upper part of base sheet 4 rotates in the inverse sequence while pressing so that it may touch the hologram element forming section 19 of hologram photosensitive material and inclined surface 101 of optical substrate L1 closely from the direction of base sheet 4. Owing to this, the hologram element forming section 19 of hologram photosensitive material comes in close contact with inclined surface 101 of optical substrate L1. The sticking roller 51 is supported by supporting member 52, pressing on laminate sheet 5 is adjusted by elastic member 53 and roller shaft 54 adjusts the rotation of sticking roller 51 in the inverse sequence.

(e) The Second Peeling Process Will be Explained as Follows, Referring to FIG. 17-FIG. 19.

The transfer mechanism transfers the laminate sheet on which the hologram element forming section 19 of hologram photosensitive material is stuck on inclined surface 101 of optical substrate L1 and from which the cover sheet 1 is peeled. With respect to the peeling roller 73, the outer surface side of base sheet 4 touches suction hole 34, whereby, the suction pump operates to make gathering suction path 77 and suction path 75 to be in the vacuum state, and the suction hole 74 sucks the outer surface side of the base sheet 4. The peeling roller 73 rotates around roller shaft 78 while sucking the outer surface side of base sheet 4 to peel the base sheet 4 and hologram element non-forming section 18 of hologram photosensitive material sticking to the base sheet 4 from hologram element forming section 19 where hologram element forming section 19 of hologram photosensitive material sticking to inclined surface 101 of optical substrate L1, and to lead the base sheet 4 and hologram element non-forming section 18 of hologram photosensitive material in the direction of the peeling.

Take-up roller 84 representing a device to pull starts taking up beginning with an end portion of the base sheet 4 which has been led. When the take-up roller 84 rotates, the base sheet 4 and hologram element non-forming section 18 of hologram photosensitive material are peeled or separated from hologram element forming section 19 of hologram photosensitive material. In this case, the neutralizing liquid sprayer 72 sprays neutralizing liquid between a surface of the sheet peeled in the direction of peeling and a cutting surface for hologram element non-forming section 18 of hologram photosensitive material and for hologram element forming section 19.

In particular, in the case of FIG. 7c, base sheet 4 representing a protective sheet, hologram element non-forming section 18 and hologram element forming section 19 are peeled in the longitudinal direction from the opposite side of the non-cutting section 21, after hologram element forming section 19 of hologram photosensitive material is stuck on optical substrate L1.

In this case, peeling roller 73 grounded in the case of peeling of a protective sheet, take-up roller 84 and conductive member 79 touch the outer surface side of base sheet 4 representing a protective sheet existing in the vicinity of the peeling portion, in the case of peeling of the base sheet 4 representing a protective sheet, in the neutralizing process in the same way as in the aforesaid first peeling process. Neutralizing liquid sprayer 72 sprays neutralizing liquid against base sheet $ representing a protective sheet existing in the vicinity of the peeling portion, and/or hologram element forming section 19 of hologram photosensitive material and hologram element non-forming section 18, in the case of peeling of base sheet 4 representing a protective sheet on the other side.

Owing to this, base sheet 4 and hologram element non-forming section 18 of hologram photosensitive material can be peeled from hologram element forming section of hologram photosensitive material, and it is possible to obtain optical substrate L1 wherein hologram element forming sections 19 of hologram photosensitive material and of a barrier sheet are stuck on inclined surface 101.

Incidentally, as shown in FIG. 18, it is also possible to peel hologram element non-forming section 18 of hologram photosensitive material and base sheet 4 to take up while neutralizing with peeling roller 73, without providing take-up roller 84, in the same way as in the aforesaid first peeling process.

(f) The exposure process and (g) developing process will be explained as follows, referring to FIG. 20 and FIG. 21.

Exposure mechanism 90 gives laser exposure to hologram element forming section 19 of hologram photosensitive material stuck on optical substrate L1 with reference light RGB1 and subject light RGB2 emitted from laser oscillators 911, 921 and 931.

Laser beams emitted from laser oscillators 911, 921 and 931 are subjected to splitted by variable beam splitters 913, 923 and 933 into reference light R1, G1 and B1 and subject light R2, G2 and B2. Reference light R1, G1 and B1 are made to be reference light RGB1 by dichroic mirrors 941 and 942 and by total reflection mirrors 943, 944 and 945, and they are made to be subject light RGB2 by dichroic mirrors 946 and 947 and by total reflection mirrors 948 and 949, and they enter the principal plane of hologram element forming section 19 of hologram photosensitive material.

Owing to this, interference fringes generated by interference between reference light and subject light on the predetermined position on hologram element forming section 19 of hologram photosensitive material are recorded on a photosensitive layer of the hologram element forming section 19 of hologram photosensitive material as changes of the reflective index.

The developing mechanism further irradiates UV or the like with an irradiation section of UV on the hologram element forming section 19 of hologram photosensitive material on which the interference fringes are recorded, to develop the hologram photosensitive material. Further, optical substrate L1 with hologram photosensitive material is subjected to baking processing in a baking processing device at about 100° C. for a period of 3-6 hours, to volatilize volatile organic substances from binder of hologram photosensitive material, to acquire hologram element 100.

Owing to this, hologram optical substrate L100 representing an eye lens used for WD and HMD is formed.

Owing to the foregoing, the following effects are obtained.

Since the half-cutting section is formed, when peeling a protective sheet on one side from a hologram photosensitive material sheet, it is possible to make the hologram element forming section of hologram photosensitive material under the condition to be capable of being stuck on an optical substrate of the protective sheet on the other side to remain, while peeling the protective sheet on one side. Further, when peeling the protective sheet on the other side after sticking the hologram element forming section of hologram photosensitive material on the optical substrate, it is possible to stick only the hologram element forming section of hologram photosensitive material to the inclined surface of the first optical substrate, while removing the hologram element non-forming section of hologram photosensitive material which has fallen into disuse.

As a result, it is possible to cut a soft hologram photosensitive material to be in a predetermined form without causing wrinkles and deflections. It is further possible to form a hologram optical element without causing lifting on hologram element forming section 19 of hologram photosensitive material which is stuck on an inclined surface of the first optical substrate, after sticking. Since it is possible to form a hologram element forming section of hologram photosensitive material simultaneously with peeling of a protective sheet, a production process can be simplified and productivity can be improved.

Further, even when the hologram element forming section of hologram photosensitive material before exposure is of a material that is damaged easily, it can be stuck on the predetermined position of the first optical substrate. Further, since it is possible to form interference fringes by giving laser exposure at a precise position by fixing the first optical substrate, sufficiency rating of hologram element can be enhanced, and production efficiency of hologram optical substrate is improved.

Further, it is possible to reduce wrinkles, deflections or damages of a hologram photosensitive material sheet having electrification characteristic which are easily caused in the case of peeling, because static electricity generated in the case of peeling can be reduced by the neutralizing device provided. In addition, it is possible to prevent a decline of quality of hologram photosensitive material caused by optical sensitizing affected by emission by static electricity and to prevent a decline of hologram elements to be formed.

By cutting a hologram photosensitive material sheet into a hologram element forming section of hologram photosensitive material, it is possible to reduce wrinkles and deflections of hologram photosensitive material in the case of peeling of a protective sheet, and to stick a hologram element forming section of hologram photosensitive material accurately on an inclined surface of the first optical substrate, and further to give laser exposure at an accurate position. It is therefore possible to form an accurate hologram element on a hologram optical substrate formed from the first optical substrate that is integrated with the second optical substrate, which is an effect. When the yield rate of the hologram optical substrate is improved, productivity of hologram-element built-in lens can be improved.

(3) Integration Process

An integration process to unify hologram optical substrate L100 and optical substrate L2 by combining them will be explained as follows, referring to FIG. 1 and FIG. 2.

The integration process includes an optical substrate forming process to form into optical substrate L2 representing the second optical substrate corresponding to an outer form of optical substrate L1 representing the first optical substrate and an adhesion process to stick a hologram optical substrate on optical substrate L2.

The optical substrate forming process is described in the aforesaid (1) Optical substrate forming process. The adhesion process includes a third peeling process that peels barrier sheet 3 adhering to a surface of hologram element 100 of hologram optical substrate L100, an adhesive coating process to coat adhesives, especially UV curing adhesives on joining surface 102 or/and joining surface 105, a lens cementing process to join the joining surface 102 of hologram optical substrate L100 and the joining surface 105 of optical substrate L2 and an adhesive hardening process to harden adhesives and to clean a lens surface. Since the integration process includes the optical substrate forming process and the adhesion process, it is possible to form hologram-element built-in lens by adhering the hologram optical substrate and the second optical substrate together, thereby, the production process can be simplified and productivity of hologram-element built-in lens can be improved, which is an effect.

In the adhesive hardening mechanism (not shown), there are provided an optical lens supporting section that fixes optical substrate L2 that is engaged with hologram optical substrate L100, an adhesive hardening and irradiating section for hardening adhesives, a temperature control section and a control section that controls the foregoing.

On the adhesive hardening and irradiating section, there is arranged a light source on the upper part or/and the lower part of optical substrate L2 that is engaged with hologram optical substrate L100. As this light source, there are given a low voltage or a high voltage mercury-vapor lamp, a UV lamp, a black light, a fluorescent lamp and natural light. Further, as a temperature control section, there is given a thermostat for baking processing, and the adhesive hardening and irradiating section is arranged in the thermostat. Hardening of adhesives is adjusted by controlling the controlling section, irradiation time of the light source, an amount of irradiation, irradiation intensity, heating time and a temperature range.

Adhesives wherein the refractive index after hardening is the same as that of optical substrate are acceptable. Among them, light-curable adhesives, UV curing adhesives in particular are preferable, because it is possible to harden them by irradiating light energy such as UV and to select those having reflective indexes for light in refractive index ranges for optical substrate L1 and optical substrate L2. Further, UV curing adhesives hardly erode surfaces of optical substrate L1 and optical substrate L2, which is preferable.

UV curing adhesives are those having at least one or more double bonds in a molecule which are of vinyl-based, acryl-based or of methacrylate-based, as a polymerizing monomer. Definite examples include alkyl acrylic acid ester such as methyl acrylate and ethyl acrylate in addition to acrylic acid and methacrylic acid, as a monofunctional monomer, alkyl methacrylic acid ester including methyl methacrylate, butyl methacrylate or their hydroxy compound, styrene monomer and acrylonitrile monomer.

Further, multifunctional monomers are allyl-based ones such as an acryl-based one and diallylphthalate like ethylene glycol dimethacrylate. In these multifunctional monomers, a cross-linking structure is obtained in the course of polymerizing and hardening process, and durability and thermal stability for the bonded portion can be improved. In particular, acryl-based polymethyl methacrylate (PMMA) and polycarbonate (PC) are included in a range of reflective index of optical substrate L1 and optical substrate L2, which is preferable. For example, there are given NOA series representing products of Norland Co., Ltd. or OPTOCAST3400 series representing products of EMI Co., Ltd.

Photopolymerization agents added to UV curing adhesives have only to be those which can be subjected to radial polymerization by ordinary UV, and there are given acetophenone-based compounds, benzophenyl-based compounds, benzoin-based compounds, thioxanone-based compounds and azylphosphine oxide-based compounds.

Incidentally, it is also possible to form a crusher on each of joining surfaces 105b and 105c of optical substrate L1a, for enhancing the bonding strength. In this case, a concave portion corresponding to the crusher is formed on each of joining surfaces 105b and 105c of optical substrate L2a. It is preferable that the optical substrate L1a in the case of forming a crusher is formed to be large in advance so that the joining surfaces 105b and 105c may be cut in the case of forming the crusher. On the optical substrate L1a, there is formed a joining surface corresponding to optical substrate L2 through cutting.

Operations and effects of the integration process will be explained as follows.

In the barrier sheet peeling process, barrier sheet 3 sticking to the surface of hologram element 100 of hologram optical substrate 100 is peeled. In the adhesive coating process, adhesives, especially UV curing adhesives are coated on joining surface 102 of hologram optical substrate L100 or/and joining surface 105 of hologram optical substrate L2. Dimensions ranging from 1 μm to 50 μm are acceptable for the thickness of adhesives to be coated. Further, the thickness ranging from 1 μm to 20 μm is preferable. In the lens cementing process, optical substrate L1 is moved toward the back side, and joining surface 102 of hologram optical substrate L100 and joining surface 105 of hologram optical substrate L2 are made to engage with each other to be cemented. In the adhesive coating process, the surface of the lens of optical substrate L2 with which the hologram optical substrate L100 is cleaned, then, joining surface which is coated with adhesives and is engaged is irradiated with a certain amount of UV for a certain period of time, so that adhesives are hardened.

In this way, the joining surface 102 of hologram optical substrate L100 and joining surface 105 of optical substrate L2 which are engaged with each other are bonded through adhesives, to form hologram-element built-in lens 200 shown in FIG. 20.

Communicated cutout portions 110 shown in FIG. 2 and microscopic recessed portions (including satin-embossed form) can be formed on optical substrate L1, hologram optical substrate L100 and on joining surface 102 of optical substrate L2 and/or joining surface 105, by an optical substrate cutting mechanism (not shown).

Incidentally, the cutout portions 110 may also be formed on optical substrate L1 and/or joining surface 102 of optical substrate L2 and/or joining surface 105, in the case of injection molding of optical substrate and of injection and compression molding in advance, without cutting optical substrate.

Owing to the foregoing, it is possible to form a hologram-element built-in lens by joining a hologram optical substrate with the second optical substrate L2 at their joining surfaces through adhesives.

Further, by providing an eyeglass frame, an LCD display section and a controller section, it is possible to use as WD and HMD. In this case, it is possible to reduce distortions and color blurring of images when forming a hologram-element built-in lens, because it is possible to stick on optical substrate L1 without causing wrinkles and deflections on hologram photosensitive material when peeling a protective sheet.

As stated above, it is possible to simplify the production process and to improve productivity of a hologram-element built-in lens, while forming a highly accurate hologram element capable of being used for WD and HMD, by including a hologram optical substrate forming process and an integration process.

The invention claimed is:

1. A hologram optical substrate manufacturing method for manufacturing a hologram optical substrate having a hologram element by a use of an optical substrate formed with an inclined surface and hologram photosensitive sheet, comprising:
   a cutting process that employs a laminate sheet having a pair of protective sheets with a hologram photosensitive sheet peelably interposed between the pair of protective sheets, and makes a cut through either one of the protective sheets, from an outer surface of the one of the protective sheets at least to a depth for cutting the hologram photosensitive sheet along a thickness direction of the laminate sheet, the cut corresponding to a hologram element forming section;
   a first peeling process that peels the protective sheet having the cut, from the hologram photosensitive sheet;
   a sticking process that sticks a hologram photosensitive material of the hologram element forming section to an inclined surface of the optical substrate formed with the inclined surface, with the hologram photosensitive material adhered to the other protective sheet;
   a second peeling process that peels the other protective sheet;
   an exposure process that exposes the hologram photosensitive material of the hologram element forming section that is stuck on the inclined surface of the optical substrate, to a laser beam after the second peeling process; and
   a developing process that develops the exposed hologram photosensitive material of the hologram element forming section so as to form a hologram element.

2. The hologram optical substrate manufacturing method of claim 1, wherein the cutting process includes making a plurality of cuts that correspond to hologram element forming sections, the plurality of cuts formed in the same direction at a predetermined interval in the cutting process.

3. The hologram optical substrate manufacturing method of claim 2, wherein non-cut sections are provided in the cutting process on an upstream side, with respect to a peeling direction, of the respective cuts that correspond to the hologram element forming sections.

4. The hologram optical substrate manufacturing method of claim 3, wherein, in the first and/or second peeling process, a neutralizing device is provided to neutralize static electricity generated at a peeling section during peeling of the protective sheet.

5. The hologram optical substrate manufacturing method of claim 4, wherein the neutralizing device comprises a grounded conductive member to contact the protective sheet during peeling of the protective sheet.

6. The hologram optical substrate manufacturing method of claim 4, wherein the neutralizing device sprays neutralizing liquid to the protective sheet and/or hologram photosensitive sheet during peeling of the protective sheet.

7. The hologram optical substrate manufacturing method of claim 2, wherein, in the first and/or second peeling process, a neutralizing device is provided to neutralize static electricity generated at a peeling section during peeling of the protective sheet.

8. The hologram optical substrate manufacturing method of claim 7, wherein the neutralizing device comprises a grounded conductive member to contact the protective sheet during peeling of the protective sheet.

9. The hologram optical substrate manufacturing method of claim 7, wherein the neutralizing device sprays neutralizing liquid to the protective sheet and/or hologram photosensitive sheet during peeling of the protective sheet.

10. The hologram optical substrate manufacturing method of claim 1, wherein, in the cutting process, a non-cut section is provided on an upstream side, with respect to a peeling direction, of the cut that corresponds to the hologram element forming section.

11. The hologram optical substrate manufacturing method of claim 10, wherein, in the first and/or second peeling process, a neutralizing device is provided to neutralize static electricity generated at a peeling section during peeling of the protective sheet.

12. The hologram optical substrate manufacturing method of claim 11, wherein the neutralizing device comprises a grounded conductive member to contact the protective sheet during peeling of the protective sheet.

13. The hologram optical substrate manufacturing method of claim 11, wherein the neutralizing device sprays neutralizing liquid to the protective sheet and/or hologram photosensitive sheet during peeling of the protective sheet.

14. The hologram optical substrate manufacturing method of claim 1, wherein, in the first and/or second peeling process, a neutralizing device is provided to neutralize static electricity generated at a peeling section during peeling of the protective sheet.

15. The hologram optical substrate manufacturing method of claim 14, wherein the neutralizing device comprises a grounded conductive member to contact the protective sheet during peeling of the protective sheet.

16. The hologram optical substrate manufacturing method of claim 14, wherein the neutralizing device sprays neutralizing liquid to the protective sheet and/or hologram photosensitive sheet during peeling of the protective sheet.

* * * * *